United States Patent
Budhia et al.

(10) Patent No.: US 10,354,794 B2
(45) Date of Patent: Jul. 16, 2019

(54) MULTI-COIL BASE PAD WITH ANGLED STRUCTURE

(71) Applicant: WiTricity Corporation, Watertown, MA (US)

(72) Inventors: Mickel Bipin Budhia, Auckland (NZ); Wojciech Chlebosz, Taufkirchen (DE); Michael Werner, Markt Schwaben (DE)

(73) Assignee: WiTricity Corporation, Watertown, MA (US)

( * ) Notice: Subject to any disclaimer, the term of this patent is extended or adjusted under 35 U.S.C. 154(b) by 43 days.

(21) Appl. No.: 15/413,658

(22) Filed: Jan. 24, 2017

(65) Prior Publication Data
US 2018/0061563 A1    Mar. 1, 2018

Related U.S. Application Data

(60) Provisional application No. 62/379,446, filed on Aug. 25, 2016.

(51) Int. Cl.
*H01F 38/14* (2006.01)
*H02J 50/10* (2016.01)
*H02J 7/02* (2016.01)

(52) U.S. Cl.
CPC .......... *H01F 38/14* (2013.01); *H02J 7/025* (2013.01); *H02J 50/10* (2016.02)

(58) Field of Classification Search
CPC .......... H01F 38/14; H02J 7/025; H02J 50/10
See application file for complete search history.

(56) References Cited

U.S. PATENT DOCUMENTS

| | | | |
|---|---|---|---|
| 2013/0093252 A1* | 4/2013 | Norconk | H02J 5/005 307/104 |
| 2015/0077053 A1* | 3/2015 | Stamenic | H02J 7/0042 320/109 |
| 2015/0224882 A1 | 8/2015 | Brill et al. | |
| 2017/0213644 A1* | 7/2017 | Lee | H01F 38/14 |

FOREIGN PATENT DOCUMENTS

| | | |
|---|---|---|
| GB | 2501482 A | 10/2013 |
| WO | 2011016737 A1 | 2/2011 |
| WO | 2012138949 A2 | 10/2012 |
| WO | 2015038544 A2 | 3/2015 |
| WO | 2016052887 A1 | 4/2016 |
| WO | 2016114893 A1 | 7/2016 |

OTHER PUBLICATIONS

International Search Report and Written Opinion—PCT/US2017/046143—ISA/EPO—dated Nov. 27, 2017.
"International Preliminary Report on Patentability", PCT Application No. PCT/US2017/046143, dated Mar. 7, 2019, 11 pages.

* cited by examiner

*Primary Examiner* — Rexford N Barnie
*Assistant Examiner* — Elim Ortiz
(74) *Attorney, Agent, or Firm* — Colby Nipper PLLC

(57) ABSTRACT

An apparatus for wirelessly transferring charging power is provided. The apparatus comprises a first coil, as second coil, a ferrite structure positioned on one side of the first coil and the second coil. The ferrite structure includes a first angled surface at an outer side of the first coil and a second angled surface at an outer side of the second coil. The ferrite structure further includes a substantially flat surface at an inner side of the first coil and an inner side of the second coil. The first angled surface and the second angled surface are at an angle to the flat surface.

29 Claims, 16 Drawing Sheets

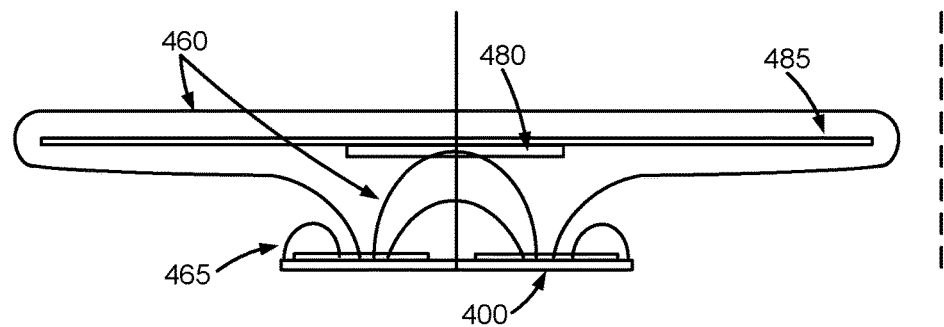
*FIG. 4B*
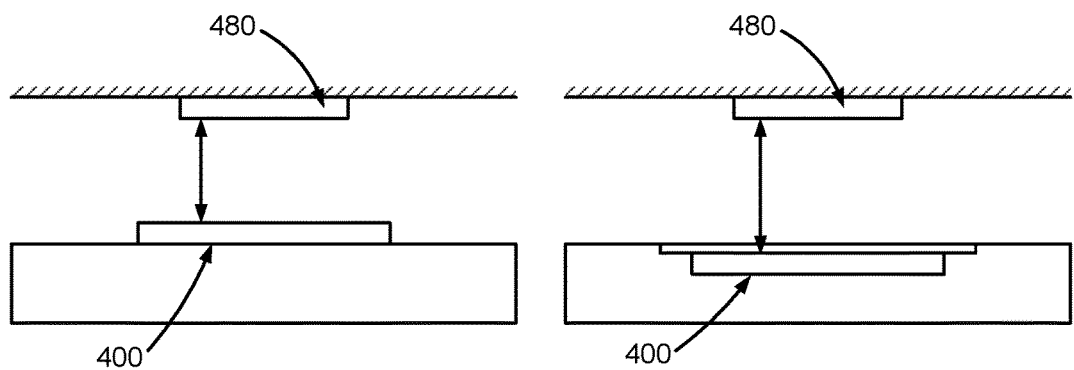
*FIG. 4C*  *FIG. 4D*

MULTI-COIL BASE PAD WITH ANGLED STRUCTURE

CROSS-REFERENCE TO RELATED APPLICATIONS

This application claims the benefit of U.S. Provisional Patent No. 62/379,446, filed Aug. 25, 2016. The content of the provisional application is hereby incorporated by reference in its entirety.

FIELD

This application is generally related to wireless power charging of chargeable devices such as electric vehicles, and more specifically to a multi-coil base pad with an angled structure for reduced emissions in, for example, flush mounted and buried wireless power transfer applications.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless power charging systems that are capable of transferring power in free space (e.g., via a wireless field) to be used to charge electric vehicles may overcome some of the deficiencies of wired charging solutions. As such, wireless power charging systems and methods that efficiently and safely transfer power for charging electric vehicles are desirable.

Inductive power transfer (IPT) systems are one means for the wireless transfer of energy. In IPT, a primary (or "base") power device transmits power to a secondary (or "pick-up") power receiver device. Each of the transmitter and receiver power devices includes inductors, typically coils or windings of electric current conveying media. An alternating current in the primary inductor produces a fluctuating magnetic field. When the secondary inductor is placed in proximity to the primary inductor, the fluctuating magnetic field induces an electromotive force (EMF) in the secondary inductor, thereby transferring power to the secondary power receiver device.

SUMMARY

According to some aspects, an apparatus for wirelessly transferring charging power is provided. The apparatus comprises a first coil, a second coil, and a ferrite structure positioned on one side of the first coil and the second coil. The ferrite structure includes a first angled surface at an outer side of the first coil and a second angled surface at an outer side of the second coil. The ferrite structure further includes a substantially flat surface at an inner side of the first coil and an inner side of the second coil. The first angled surface and the second angled surface are at an angle to the flat surface.

In some other aspects, a method for wirelessly transferring charging power is provided. The method includes driving each of a first coil and a second coil with a current to generate an alternating magnetic field. The method further includes wirelessly transferring charging power to at least one wireless power receiver via the alternating magnetic field. The first coil and the second coil are positioned on one side of a ferrite structure. The ferrite structure includes a first angled surface at an outer side of the first coil and a second angled surface at an outer side of the second coil. The ferrite structure further includes a flat surface at an inner side of the first coil and an inner side of the second coil. The first angled surface and the second angled surface are at an angle to the flat surface.

In yet other aspects, an apparatus for wirelessly transferring charging power is provided. The apparatus includes means for generating an alternating magnetic field. The apparatus further includes means for wirelessly transferring charging power to at least one wireless power receiver via the alternating magnetic field. The means for wirelessly transferring charging power includes a ferrite structure. The ferrite structure includes a first angled surface at a first outer side of the ferrite structure and a second angled surface at a second outer side of the ferrite structure. The ferrite structure further includes a flat surface at an inner side of the ferrite structure. The first angled surface and the second angled surface are at an angle to the flat surface.

In yet other aspects, An apparatus for wirelessly transferring charging power is provided. The apparatus includes a first coil having a plurality of turns wound around a first opening. The first coil has a first side and a second side. The apparatus further includes a second coil having a plurality of turns wound around a second opening. The second coil has a first side and a second side. The second coil is positioned adjacent to or partially overlapping the first coil. The first side of the first coil is positioned adjacent to and closer to the first side of the second coil than to the second side of the second coil. The plurality of turns of the first side of the first coil and the first side of the second coil are substantially co-planar to one another. The plurality of turns of the second side of the first coil and the second side of the first coil are at an angle relative to the first side of the first coil and the first side of the second coil. The apparatus further includes a ferromagnetic layer positioned on one side of the first and second coils.

BRIEF DESCRIPTION OF THE DRAWINGS

FIG. 4B illustrates an example coupling between the base pad of FIG. 4 and a vehicle pad, in accordance with some aspects.

FIG. 4C illustrates the base pad of FIG. 4 mounted on top of a surface, in accordance with some aspects.

FIG. 4D illustrates the base pad of FIG. 4 flush mounted below a surface, in accordance with some aspects.

DETAILED DESCRIPTION

Figure 1:
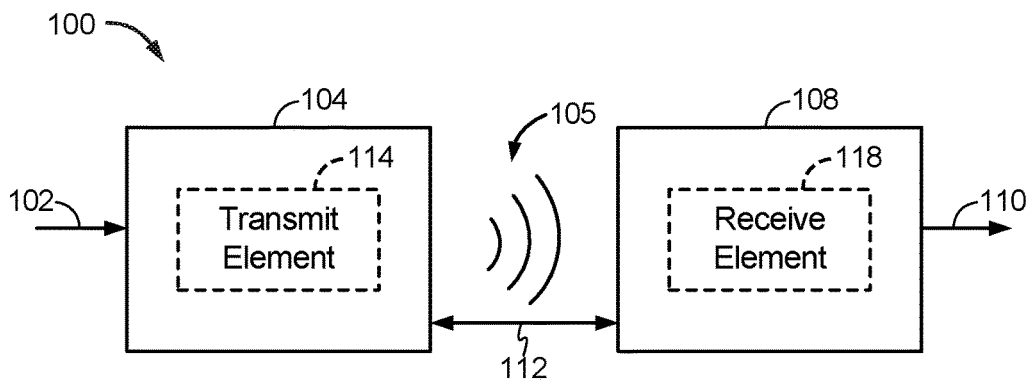
FIG. 1 is a functional block diagram of a wireless power transfer system, in accordance with some aspects.

In the following detailed description, reference is made to the accompanying drawings, which form a part of the present disclosure. The illustrative aspects described in the detailed description, drawings, and claims are not meant to be limiting. Other aspects may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicles may be hybrid electric vehicles that include a traditional combustion engine for direct locomotion or for charging the vehicle's battery in addition to electric motors. Other electric vehicles may draw all locomotive ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular aspects only and is not intended to be limiting of the disclosure. It will be understood that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Wireless power transfer systems utilize a primary coil to generate an alternating magnetic field from which a secondary or receiving coil may wirelessly extract energy. Current vendors are requesting primary coils within base pads that are either flush mounted or buried in parking surfaces. Such requests necessarily increase the distance between the primary coil and the secondary coils in chargeable vehicles. Such increased distances result in the need for alternating fields of increasing strength to transfer a given amount of power, which increases the electromagnetic field emissions levels of primary coil designs. Considering current legal limits on electromagnetic field emissions, base pads with reduced emissions in flush mounted and buried wireless power transfer applications are desirable. In certain aspects, a "base pad" may refer to a portion of a wireless power transmitter configured to transmit wireless power to a wireless power receiver, such as a wireless power receiver in a vehicle. In particular, the "base pad" may refer to the coil, antenna, etc. design that emits the wireless power field. It should be noted that though certain coil and ferrite designs are described herein with respect to a base pad, such coil and ferrite designs may also be used for a wireless power receiver, such as a vehicle pad, or other power receiving element.

FIG. 1 is a functional block diagram of a wireless power transfer system 100, in accordance with an illustrative embodiment. Input power 102 may be provided to a transmitter circuit 104 from a power source (not shown in this figure) to generate a wireless (e.g., magnetic or electromagnetic) field 105 for performing energy transfer. A receiver circuit 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element circuit 114 (e.g., a base pad) for transmitting/coupling energy to the receiver 108. The receiver 108 may include a power receiving element circuit 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain aspects, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
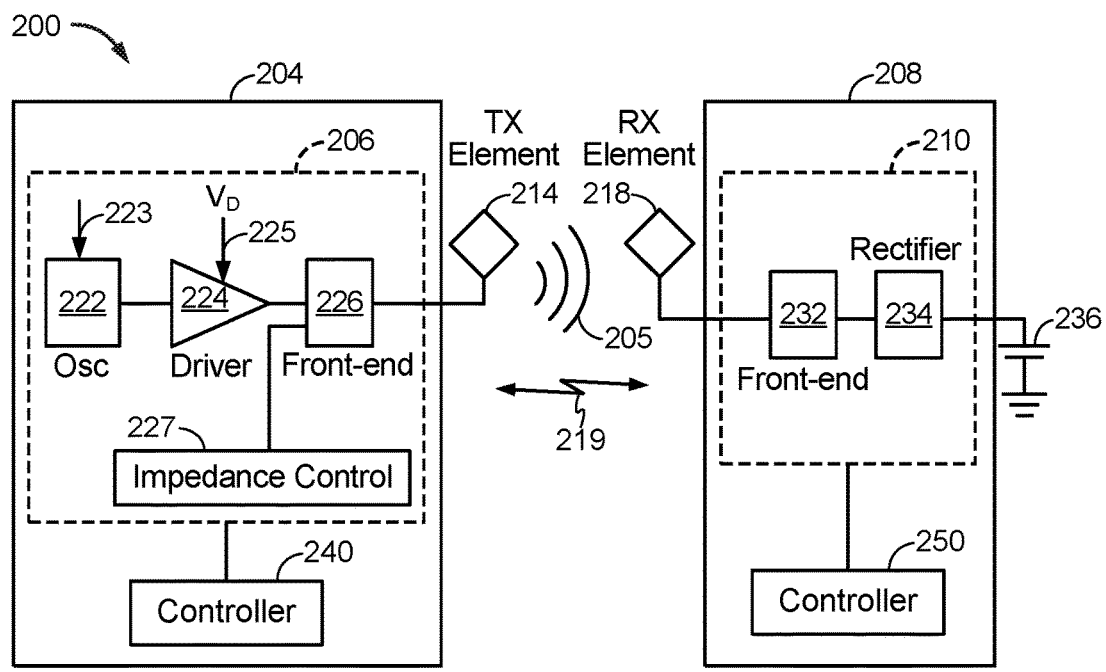
FIG. 2 is a functional block diagram of a wireless power transfer system, in accordance with some other aspects.

FIG. 2 is a functional block diagram of a wireless power transfer system 200, in accordance with another illustrative embodiment. The system 200 may be a wireless power transfer system of similar operation and functionality as the system 100 of FIG. 1. However, the system 200 provides additional details regarding the components of the wireless power transfer system 200 than FIG. 1. The system 200 may include a transmitter circuit 204 and a receiver circuit 208. The transmitter 204 may include transmit circuitry 206 that may include an oscillator circuit 222, a driver circuit 224, a front-end circuit 226, and an impedance control module circuit 227. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 (e.g., a base pad) based on an input voltage signal (VD) 225. The driver circuit 224 may be a switching amplifier configured to receive a square wave from the oscillator 222 and output a sine wave.

The front-end circuit 226 may include a filter circuit to filter out harmonics or other unwanted frequencies. The front-end circuit 226 may include a matching circuit to match the impedance of the transmitter 204 to the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load. The impedance control module circuit 227 may control the front-end circuit 226.

The transmitter 204 may further include a controller circuit 240 operably coupled to the transmit circuitry 206 configured to control one or aspects of the transmit circuitry 206 or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 may include receive circuitry 210 that may include a front-end circuit 232 and a rectifier circuit 234. The front-end circuit 232 may include matching circuitry to match the impedance of the receive circuitry 210 to the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller circuit 250 configured similarly to the transmit controller 240 as described above for managing one or more aspects of the wireless power receiver. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter and the receiver. In some aspects, the wireless power transfer system 200 represents a more detailed view of the wireless power transfer system 100.

Figure 3:
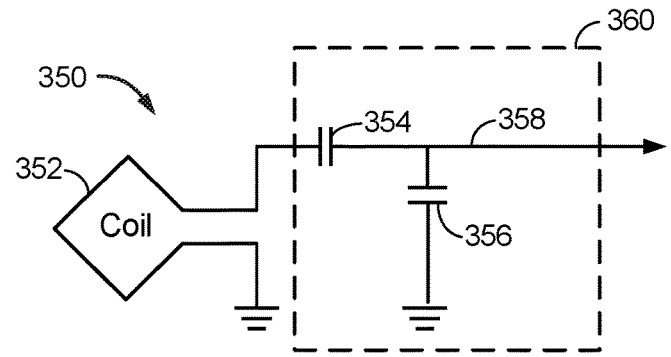
FIG. 3 is a schematic diagram of a portion of transmit circuitry or receive circuitry of FIG. 2 including a transmit or receive coupler, in accordance with some aspects.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element circuit 352 and a tuning circuit 360. The power transmitting or receiving element 352 may also be referred to or be configured as an antenna or a "loop" antenna or a "base pad". The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356 may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Embodiments and descriptions provided herein may be applied to resonant and non-resonant implementations (e.g., resonant and non-resonant circuits for power transmitting or receiving elements and resonant and non-resonant systems). In some aspects, the transmit or receive circuitry 350 may facilitate wireless power reception or transmission at a frequency that is more efficient than wireless power reception or transmission using transmit or receive circuitry without the tuning circuit 360.

Figure 4:
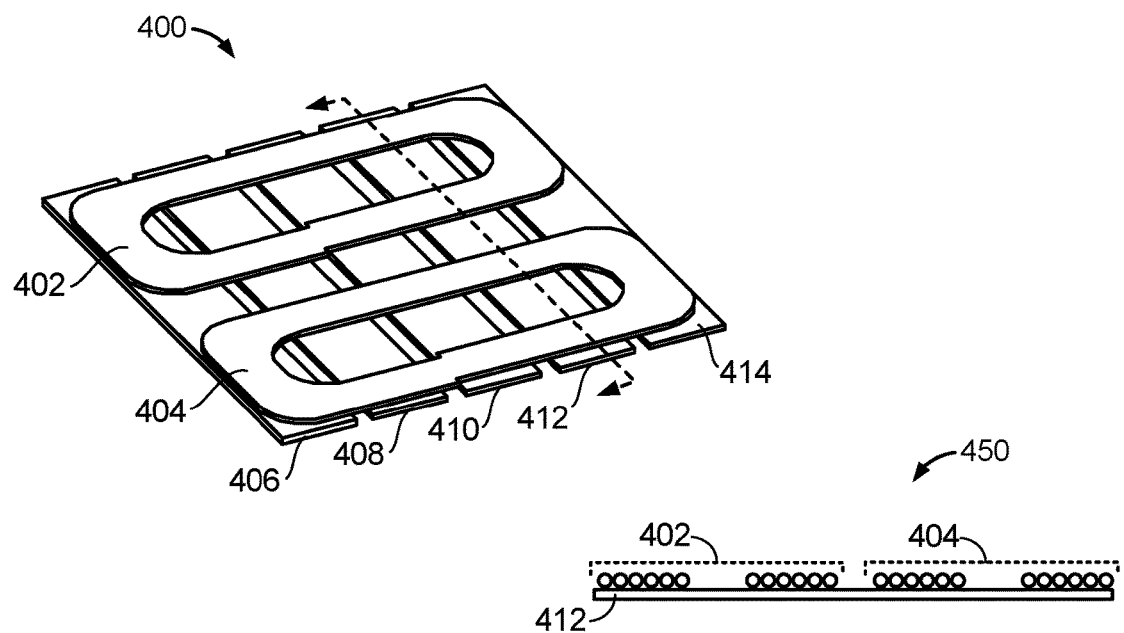
FIGS. 4 and 4A illustrate a double-D coil arrangement in a base pad, in accordance with some aspects.

FIG. 4 illustrates a double-D coil arrangement in a base pad 400, in accordance with some aspects. As discussed, the base pad 400 may be a portion of a wireless power transmitter configured to emit a wireless power field. For example, the base pad 400 may be an implementation of power transmitting element 114, power transmitting element 214, and/or power transmitting element 352. Further, as discussed, through certain features of coil and ferrite design are described herein with respect to a base pad of a wireless power transmitter, the same or similar coil and/or ferrite designs may be used for a wireless power receiver, such as a vehicle pad or other power receiving element (e.g., 118, 218, 352, etc.). The base pad 400 comprises a first coil 402 and second coil 404 disposed adjacent to one another in a "double D" coil configuration. A first conductor of the first coil 402 and a second conductor of the second coil 404 are each wound on a plane (e.g., are coplanar) on or over a plurality of ferrite structures 406, 408, 410, 412, 414, as shown by the dotted line cut away, in view 450. In some embodiments (not shown), the ferrite structures 406-414 may be formed of a single continuous piece of ferrite. The base pad 400 may be mounted on a driving or parking surface. Such mounting arrangement allows the base pad 400 to be as close as practical to a vehicle pad (not shown) situated above the base pad 400 for wireless power transfer. In various embodiments, any of the coils described herein (for example, the first coil 402 and the second coil 404) can correspond to the power transmitting elements described in FIGS. 1-3 (for example, the transmit element 114, the TX element 214, etc.). Further, the vehicle pad can correspond to power receiving elements described in FIGS. 1-3 (for example, the receive element 118, RX element 218, etc.). The vehicle pad may be coupled to a battery of a vehicle to charge the battery of the vehicle, and also have a vehicle shield between the vehicle and the vehicle pad to prevent emissions from damaging the vehicle.

Figure 4A:
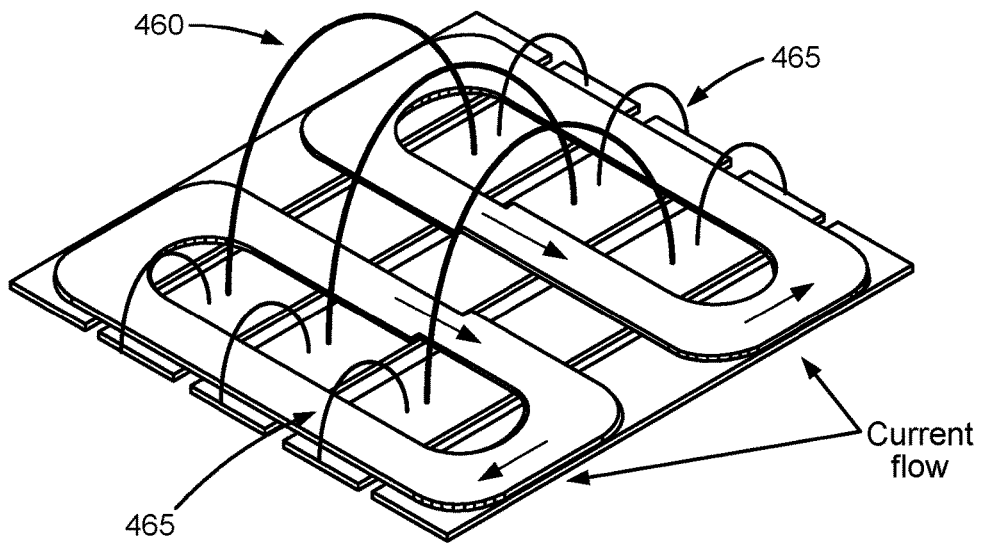

In various embodiments of operation, the coils 402 and 404 can be driven with current such that the direction of current is the same in the inner adjacent sides of each coil 402 and 404. For example, the first coil 402 can be driven with current flowing clockwise while the second coil 404 is driven with current flowing counterclockwise (and vice versa). Accordingly, two poles can be created within the openings of each coil 402 and 404. Flux 460 (also referred to as "main flux") can exit from one pole in one opening and arch over the middle at the center of the coils 402 and 404 (in a horizontal fashion), and then enter at the other pole in the other opening, channeled through the ferrite structures 406, 408, 410, 412, 414, such as shown in FIG. 4A. Flux 465 (also referred to as "side flux") can further exit from the pole in the opening of one of the coils 402 and 404 and arch over the outer side of the one of the coils 402 and 404 (in a horizontal fashion), and then enter at the outside of the one of the coils 402 and 404 channeled through the ferrite structures 406, 408, 410, 412, 414, such as shown in FIG. 4A. Flux 465 can further exit from the outside of the one of the coils 402 and 404 and arch over the outer side of the one of the coils 402 and 404 (in a horizontal fashion), and then enter at the pole in the opening of one of the coils 402 and 404 channeled through the ferrite structures 406, 408, 410, 412, 414, such as shown in FIG. 4A. In particular, the main flux and side flux of the base pad 400 refer to the flow of electromagnetic emissions from the base pad 400.

Based on the design of base pad 400 as shown, at certain power levels a portion of the main flux 460 may encircle the vehicle pad 480 and vehicle shielding 485 for the vehicle pad 480, thereby causing electromagnetic emissions in the vicinity of the vehicle, for example, as shown in FIG. 4B. In particular, a portion of the main flux 460 may, as shown, move at an angle away from the vehicle pad 480 and cause electromagnetic emissions, as the main flux 460 may overpower the side flux 465. The side flux 465 may contribute less to emissions due to the opposing current direction (from the inner side and outer side of each of the coils 402 and 404) resulting in field cancellation at distances from the base pad 400.

In some aspects, the first coil 402 and the second coil 404 may be wound from a single conductor (e.g., litz wire) in a series connection. In some other aspects, the first coil 402 and the second coil 404 may be wound from distinct (i.e., separate or different) conductors.

As discussed, the base pad 400 may be mounted on a driving or parking surface, such as shown in FIG. 4C. However, some vendors desire that base pads be flush mounted or buried in the driving or parking surface due to vehicle clearance as well as cosmetic considerations, such as shown in FIG. 4D. In such flush mount implementations, the base pad 400 may be farther removed (e.g., by approximately 60 mm for one exemplary application) from the vehicle pad (not shown). In such buried mount implementations, the base pad 400 may be additionally farther removed (e.g., by approximately 130 mm for another exemplary application) from the vehicle pad (not shown). To accommodate for this increased z-gap between the base pad 400 and the vehicle pad, increased currents may be driven through the first coil 402 and the second coil 404 in order to increase the magnetic field strength such that its magnitude is sufficient at the vehicle pad for rated wireless charging. Such increases in driving current increase electromagnetic emissions from the base pad 400. To avoid such increased electromagnetic emissions, power ratings may be reduced (e.g., from 20 kW to 10 kW) or significantly larger vehicle pads may be used. Both options may be potentially costly.

Accordingly, certain aspects described herein provide base pads with reduced emissions, for example, in flush mounted and buried wireless power transfer applications. In particular, certain aspects related to multi-coil base pads with an angled ferrite structure to reduce emissions as discussed herein. Certain aspects are described with respect to a double-D coil arrangement. However, it should be noted that certain aspects described herein may also be used with other appropriate multi-coil arrangements. In addition, certain aspects are described herein with respect to charging electrical vehicles. However, it should be noted that certain aspects described herein may also be used for charging other appropriate devices. For example, FIG. 5 illustrates an example of such a multi-coil base pad, according to certain aspects.

Figure 5:
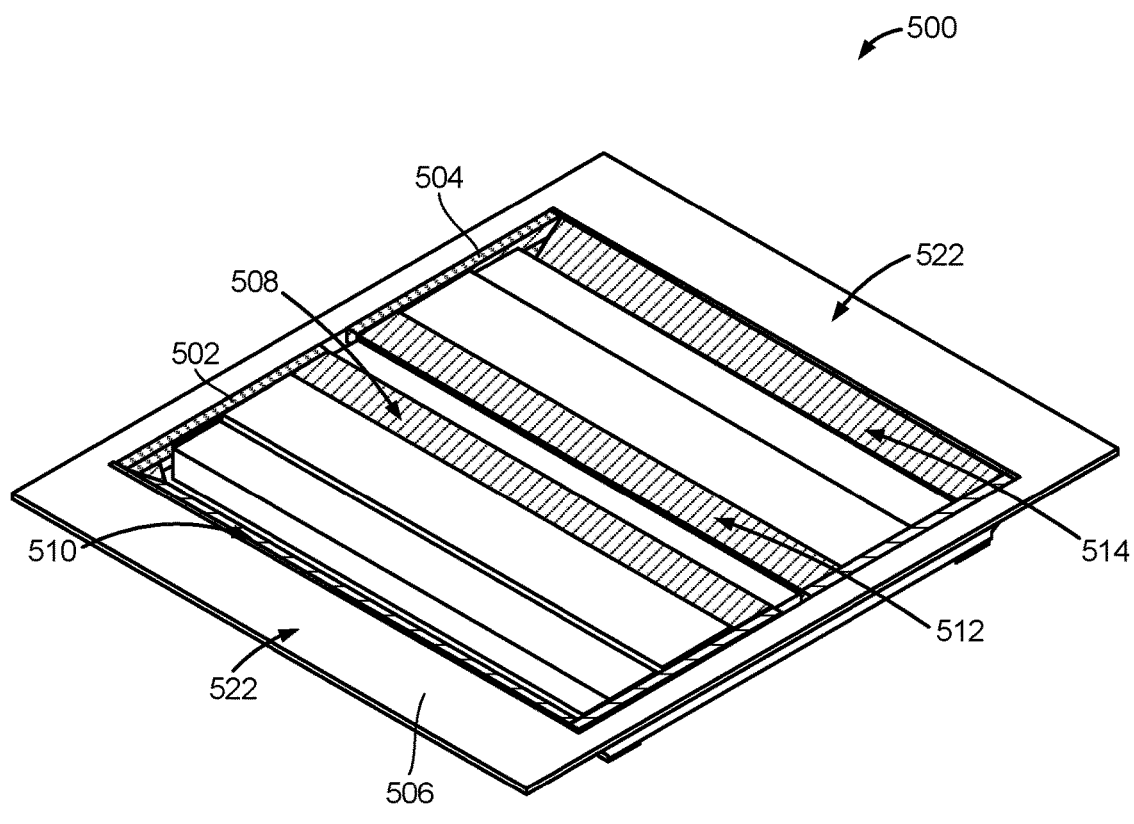
FIG. 5 illustrates a double-D base pad with angled structure, in accordance with some aspects.
Figure 5A:
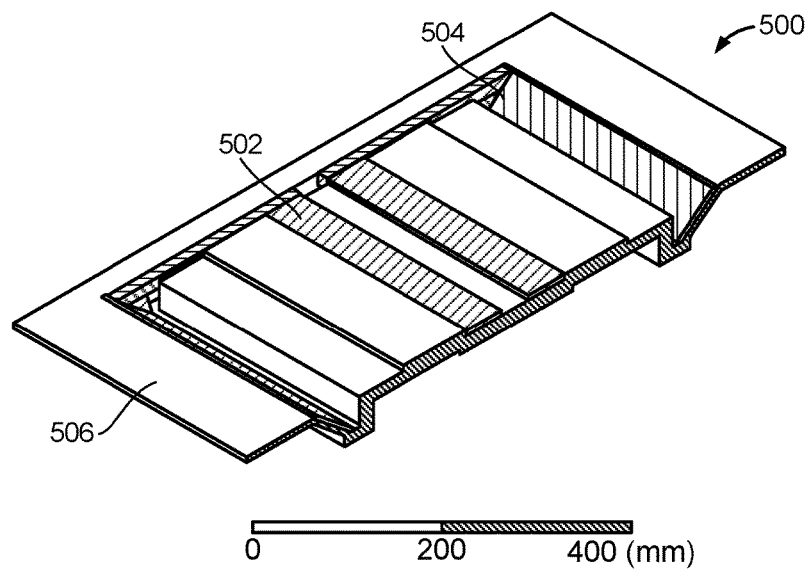
FIGS. 5A and 5B illustrate cutaway views of the base pad of FIG. 5.
Figure 5B:
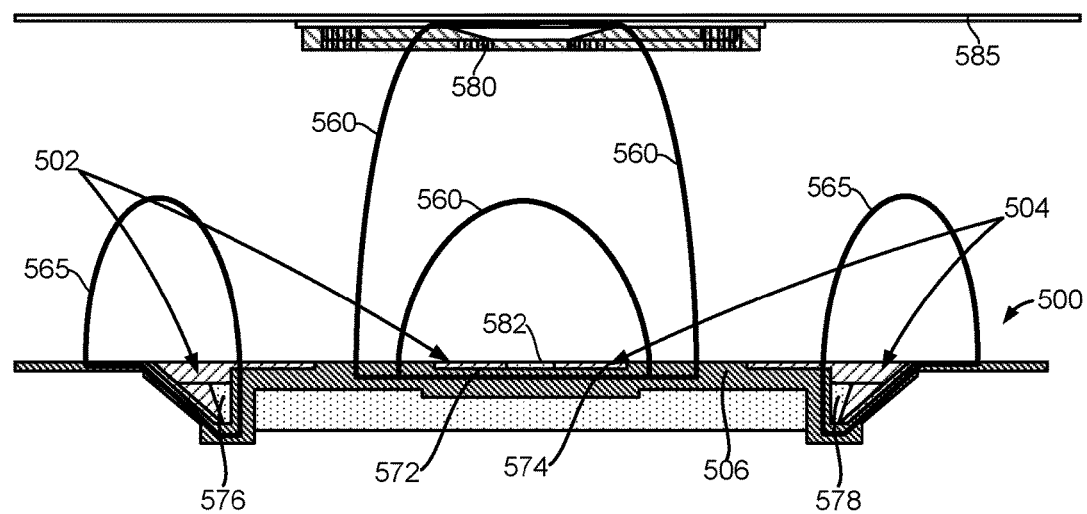

FIG. 5 illustrates a double-D base pad 500 with angled structure, in accordance with some aspects. FIGS. 5A and 5B illustrate cutaway views of the base pad 500. The base pad 500 includes a ferrite structure 506 (e.g., a ferromagnetic layer). As shown, the ferrite structure 506 is shown as one solid piece, but in some embodiments (not shown) the ferrite structure 506 may be made of separate pieces with or without gaps between the pieces, similar to the base pad 400.

The base pad 500 further comprises a first coil 502 and a second coil 504. In some aspects, the first coil 502 and the second coil 504 comprise a double D coil configuration. In some aspects, the first coil 502 and the second coil 504 may be wound from a single conductor (e.g., litz wire) in a series connection. In some other aspects, the first coil 502 and the second coil 504 may be wound from distinct (i.e., separate or different) conductors. An inner side 508 of the first coil 502 is disposed adjacent to or faces an inner side 512 of the second coil 504. In certain aspects, the first coil 502 and the second coil 504 do not overlap. In certain aspects, the first coil 502 and second coil 504 may at least partially overlap (not shown). For example, a portion of the inner side 508 may overlap (e.g., be positioned on one side of, such as above or below) with a portion of the inner side 512. At least a portion of the first coil 502 may be recessed into the ferrite structure 506 and may comprise a first conductor wound in one or more layers at an outer side 510 of the first coil 502 and wound in one or more layers on an inner side 508 of the first coil 502. At least a portion of the second coil 504 is also recessed into the ferrite structure 506 and may comprise a second conductor wound in one or more layers at an outer side 514 of the second coil 504 and wound in a one or more layers on an inner side 512 of the second coil 504. In some embodiments, the number of layers at the inner sides 508/512 is the same as the number of layers at the outer sides 510/514. In some embodiment, the number of layers at the inner sides 508/512 is less than the number of layers at the outer sides 510/514. Thus, as shown in FIG. 5, the term "inner side" is with respect to the orientation of the first coil 502 and the second coil 504, e.g., a first side of the first coil 502 facing and disposed closest to the second coil 504, and a first side of the second coil 504 facing and disposed closest to the first coil 502. Contrarily, the term "outer side" indicates a second side opposite the "inner side" of the same coil.

In the illustrated embodiment, the ferrite structure 506 extends laterally beyond the edges of the first coil 502 and the second coil 504. The extensions on the outer edges may provide a path for flux to travel as shown by flux 565 (FIG. 5B) that may otherwise contribute to emissions on the outer edges. In some embodiments, the ferrite structure 506 extends laterally beyond the outer sides 510/514 of the first coil 502 and second coil 504 in directions perpendicular to the outer sides 510/514, but may not extend beyond the first coil 502 and second coil 504 in directions parallel to the outer sides 510/514. In some embodiments there is a ferrite border 522 along the entire perimeter of each of the first coil 502 and the second coil 504. The first coil 502 is disposed adjacent to the second coil 504 to form a "double D" arrangement. In some embodiments, the ferrite structure 506 can be configured having gaps such as those shown between the ferrite structures 406, 408, 410, 412, 414 of FIG. 4. In some embodiments, the ferrite structure 506 can be made of individual blocks, which in some embodiments can cover the entire surface of the pad 500.

As shown, the first coil 502 and second coil 504 may be recessed into the ferrite structure 506. In some embodiments, the first coil 502 and second coil 504 may not be recessed into the ferrite structure 506 and instead may be formed above the ferrite structure 506 (e.g., above a substantially planar surface at the top of the ferrite structure 506). For example, recesses in the ferrite structure 506 may be formed below the first coil 502 and second coil 504 (e.g., similar to embodiments described with respect to FIG. 11). The ferrite structure 506 may include a substantially planar surface at the top of the ferrite structure 506 as shown. The planar surface of the ferrite structure 506 may be configured to sit parallel or flush with a driving surface the base pad 500 is disposed in. Further, the ferrite structure 506 may include recesses 572 and 574 (FIG. 5B) for the first coil 502 and second coil 504, respectively. In particular, the ferrite structure 506 may include recesses 572 and 574 under the inner sides 508 and 512 that have a surface that is substantially parallel with the substantially planar surface of the ferrite structure 506. The inner sides 508 and 512 may further be substantially parallel with the recesses 572 and 574 under the inner sides 508 and 512. Further, as shown, portions of the first coil 502 and second coil 504, including the inner sides 508 and 512, may be disposed above a plane flush with the surface of the ferrite structure 506. In certain aspects, instead of including separate recesses 572 and 574, the ferrite structure 506 includes a single contiguous recess. Accordingly, with a single recess, there may not be ferrite between the first coil 502 and second coil 504, but rather an empty gap. In other words, in certain aspects the portion 582 of the ferrite structure 506 may not be included. The recesses 572 and 574 of the ferrite structure 506 may improve coupling of the base pad 500 to the vehicle pad 580. Further, in some embodiments, the ferrite structure 506 may be thicker under the inner sides 508 and 512 to prevent saturation and lower core loss.

The ferrite structure 506 may further includes recesses 576 and 578 under the outer sides 510 and 514 of the first coil 502 and the second coil 504, respectively. The recesses 576 and 578 under the outer sides 510 and 514, as shown, include angled surfaces that are angled with respect to the substantially planar surface at the top of the ferrite structure 506. In some embodiments, the angle of the angled surfaces with respect to the planar surface may be between 30 degrees and 60 degrees. In the embodiment shown, the angle may be about 38 degrees. The outer sides 510 and 514 of the first coil 502 and the second coil 504 may be substantially parallel to the angled surface of the respective recesses 576 and 578 of the ferrite structure 506 under the outer sides 510 and 514, and therefore also be at an angle (e.g., between 30 degrees and 60 degrees) with respect to the planar surface of the ferrite structure 506. Accordingly, in some aspects, the outer sides 510 and 514 may be at the angle to the inner sides 508 and 512, where the inner sides 508 and 512 are substantially parallel to the substantially planar surface of the ferrite structure 506 and co-planar to each other. Further, in some aspects, the ferrite structure 506 may be substantially planar and not include angled surfaces, and rather only the outer sides 510 and 514 may be at the angle.

The recesses 576 and 578 may have a substantially triangular shape (e.g., right triangular). For example, a side surface of each of the recesses 576 and 578 closest to the recesses 572 and 574, respectively, may be substantially perpendicular to the planar surface at the top of the ferrite structure 506. Further, each of the recesses 576 and 578 may, as shown, include a bottom surface that is substantially parallel to the planar surface. In some embodiments, the recesses 576 and 578 may not include a bottom surface that is substantially parallel to the planar surface. Each of the recesses 576 and 578 further include the aforementioned angled surface. The angled surface of the recess 576 may face up toward the vehicle pad and toward the recess 572, and accordingly the inner sides 508 and 512. The angled surface of the recess 578 may face up toward the vehicle pad and toward the recess 574, and accordingly the inner sides 508 and 512.

As shown in FIG. 5B, the flux output from the base pad 500 may have less excess emissions than the flux output from the base pad 400. In particular, the angled surfaces of the recesses 576 and 578 of the ferrite structure 506 and the angled outer sides 510 and 514 of the first coil 502 and second coil 504, respectively, may cause the side flux 565, on either side of the main flux 560, to shift toward the main flux 560 as compared to the base pad 400, which does not have such angled surfaces or coils. In particular, the angled outer sides 510 and 514 of the first coil 502 and second coil 504, respectively, may increase the magnetic pressure and therefore the flux density in the areas above the outer sides 510 and 514. Accordingly, the main flux 560 leaves the base pad 500 at a more vertical angle, and less of the main flux 560 leaks to the side of the vehicle pad 580 and therefore around the vehicle shield 585 as excess emissions. The ferrite border 522 to the outside of the outer sides 510 and 514 may further allow the side flux 565 to leave or return, so as to generate the appropriate side flux 565.

Figure 6:
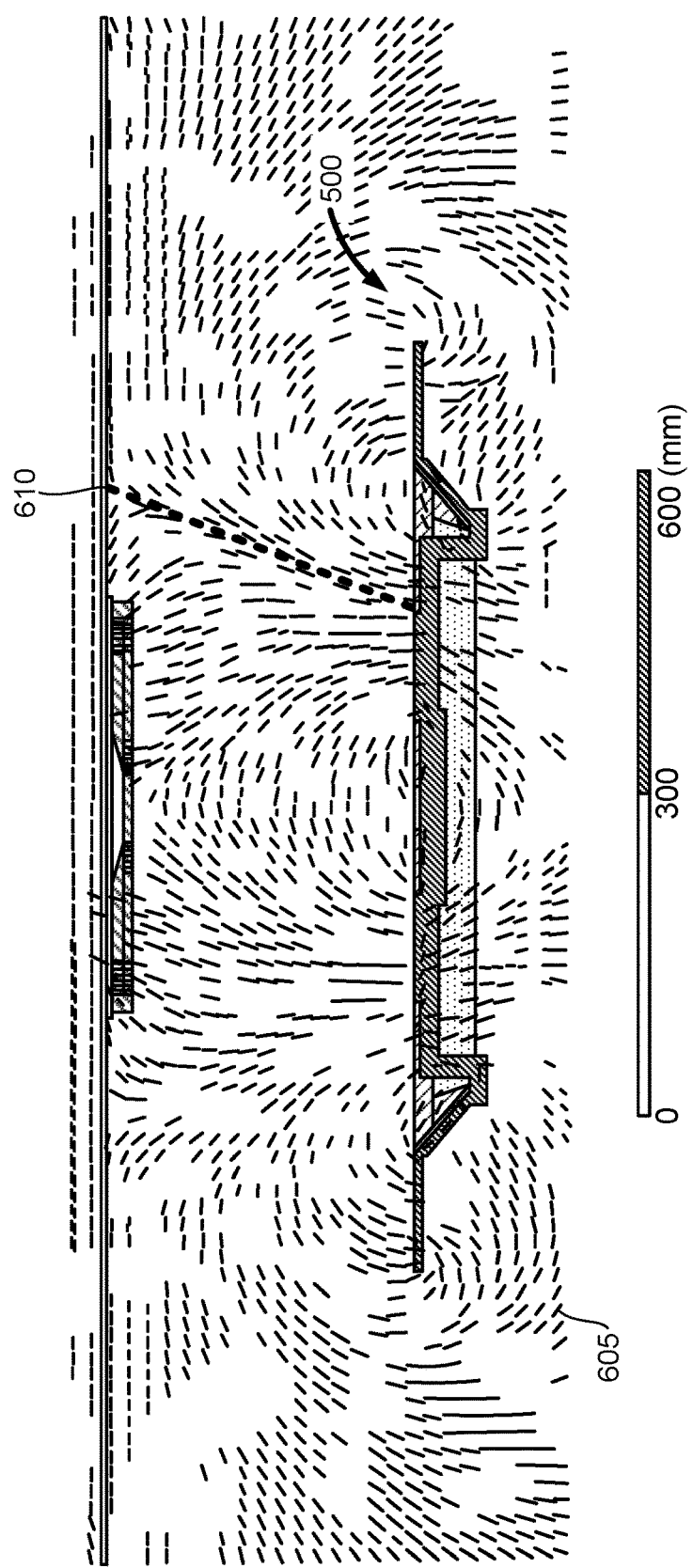
FIG. 6 illustrates the overall flux from a base pad with angled ferrite structure, in accordance with some aspects.

For example, FIG. 6 illustrates the overall flux from a base pad with angled ferrite structure, and optionally angled outer sides of coils, such as base pad 500. Each arrow 605 represents the flux path of the emissions (e.g., including main flux 560 and side flux 565) from the base pad 500. The dotted line 610 represents an approximate division line separating the portion of the flux (e.g., including main flux 560 and side flux 565) that couples with the vehicle pad and a portion of the flux that is potential leakage emissions. Though not shown, there is a similar division on the opposite side of the base pad 500. The angled surface of the ferrite structure, and optionally angled outer sides of the coils, of the base pad 500 cause the angle of the division line to be greater than that of base pad 500, and therefore less flux escapes as unwanted leakage emissions. The angle of the angled surface of the ferrite structure, and optionally angled outer sides of the coils, may be adjusted to adjust the angle of the division line 610. For example, magnetic flux may tend to enter/exit ferrite at a 90 degree angle. Accordingly, the direction of the flux can be controlled to some extent by controlling the shape and angle of the ferrite structure of the base pad 500.

In some aspects, the first coil 502 may also be known as, or comprise at least a portion of first means for wirelessly transferring power. Likewise, the second coil 504 may also be known as, or comprise at least a portion of second means for wirelessly transferring power. In some aspects, the ferrite structure 506 may also be known as, or may comprise at least a portion of means for channeling magnetic flux.

In some aspects, successive windings of the first coil 502 are separated by a nonzero distance at the outer side of the first coil 502 (e.g., successive windings are not in physical contact with one another) and successive windings of the second coil 504 are separated by a nonzero distance at the outer side of the second coil 504 (e.g., successive windings are not in physical contact with one another). The nonzero distance separating successive windings of the first coil 504 may be the same as or different from the nonzero distance separating successive windings of the second coil 504. In some other aspects, successive windings of the first coil 502 are substantially in physical contact with one another (however electrically insulated from turn to turn) at the outer side of the first coil 502 and successive windings of the second coil are substantially in physical contact with one another (however electrically insulated from turn to turn) at the outer side of the second coil 504. In some aspects, the ferrite structure 506, the first coil 502 and the second coil 504 are buried in a driving surface. In some other aspects, the ferrite structure 506, the first coil 502 and the second coil 504 are flush mounted in a driving surface. In yet other aspects, the ferrite structure 506, the first coil 502 and the second coil 504 are mounted on a driving surface (e.g., incorporated into a pad resting on top of the driving surface which may provide for reduced emissions with a potentially thicker pad profile).

Figure 7:
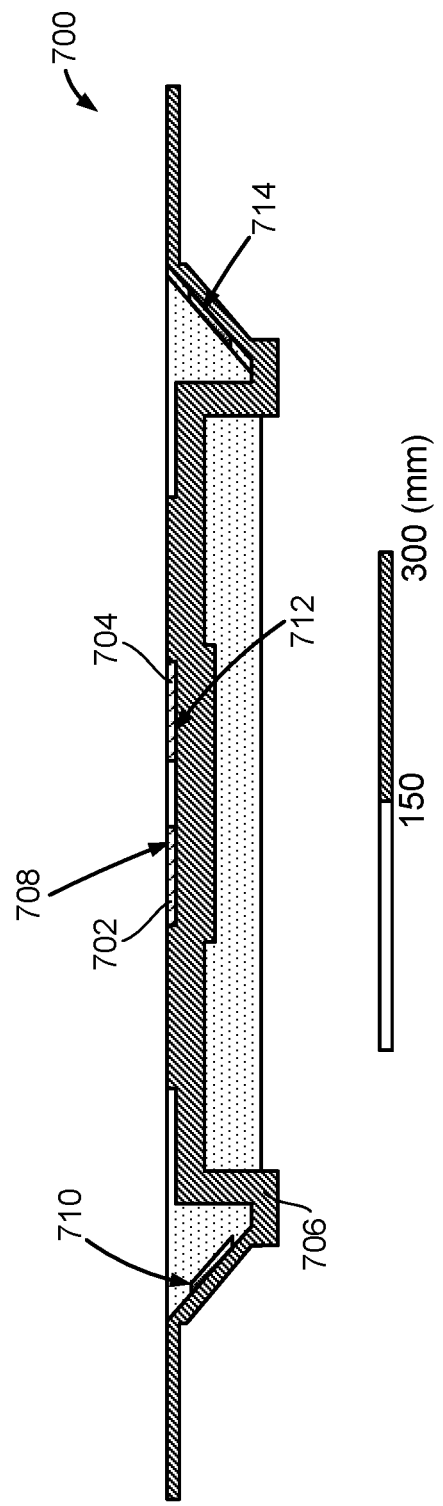
FIG. 7 illustrates a cutaway view of a double-D base pad with angled structure, in accordance with some aspects.

FIG. 7 illustrates a double-D base pad 700 with angled structure, in accordance with some aspects. In particular, the base pad 700 may be similar to the base pad 500 described with respect to FIG. 5. However, the base pad 700 includes narrower coils 702 and 704 (e.g., the turns/windings of the conductor are more closely wound) than the coils 502 and 504 of the base pad 500. For example, one or more of the inner sides 708, 712, and outer sides 710 and 714 may be narrower than the coils 502 and 504. Further, as shown, the outer sides 710 and 714 may not cover the entire angled surfaces of the ferrite structure 706 of the base pad 700.

Figure 8:
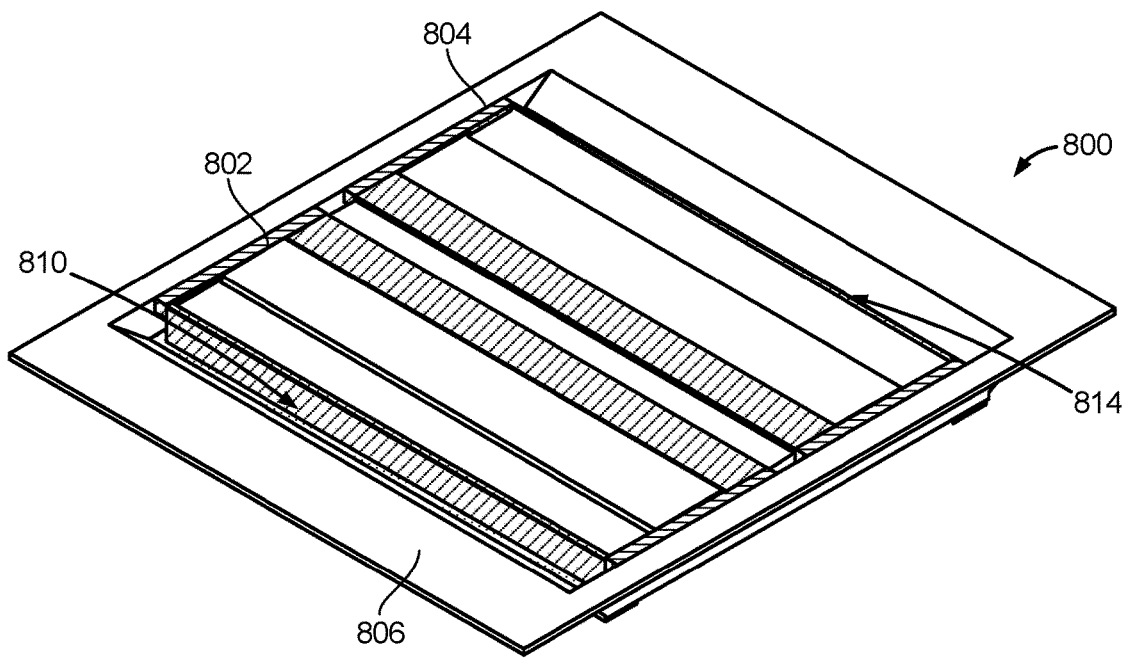
FIG. 8 illustrates a double-D base pad with angled structure, in accordance with some aspects.
Figure 8A:
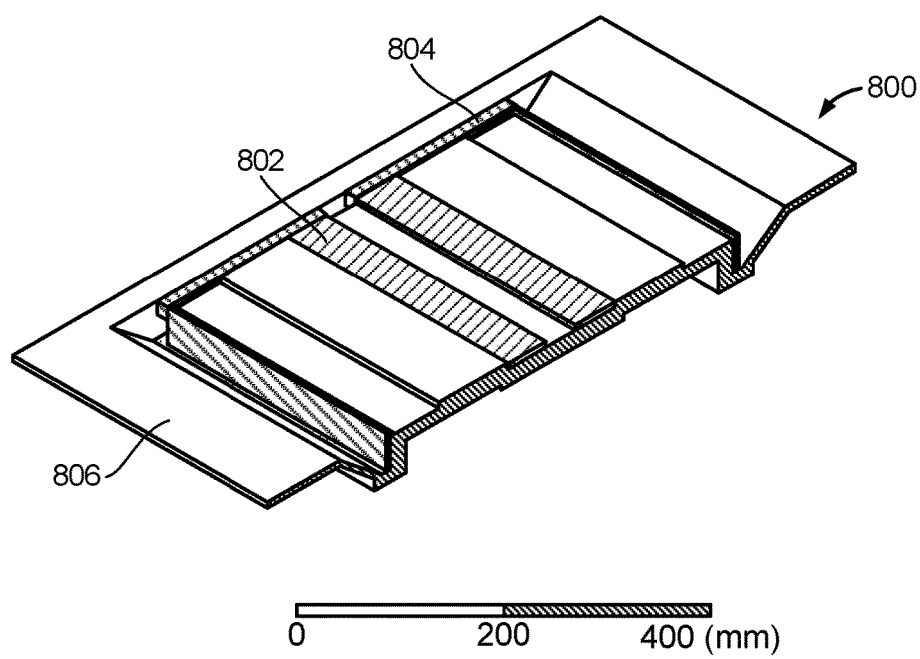
FIGS. 8A and 8B illustrate cutaway views of the base pad of FIG. 8.
Figure 8B:
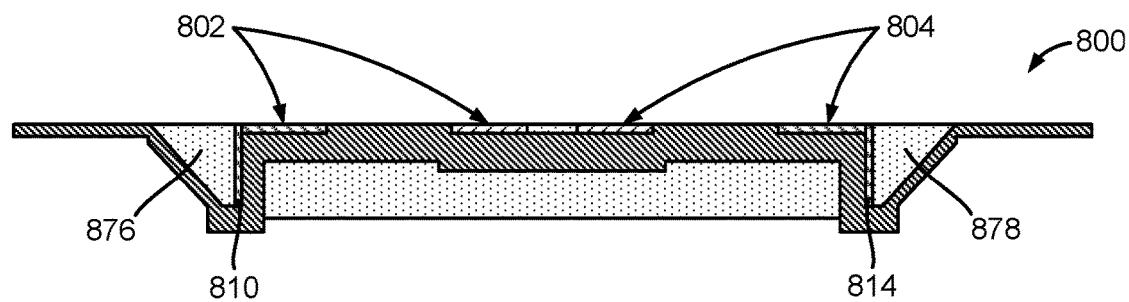

FIGS. 8-8B illustrate a double-D base pad 800 with angled structure, in accordance with some aspects. In particular, the base pad 800 may be similar to the base pad 500 described with respect to FIG. 5. However, the base pad 800 includes coils 802 and 804 with outer sides 810 and 814, respectively, that are at a different angle and on a different portion of the ferrite structure 806 as compared to the coils 502 and 504 of the base pad 500. In particular, the outer sides 810 and 814 are substantially perpendicular (i.e. 90 degrees) to the top planar surface of the ferrite structure 806. Further, the outer sides 810 and 814 are formed over side surfaces of recesses 876 and 878, respectively, as opposed to angled surfaces of the recesses 876 and 878. Accordingly, the side flux of the base pad 800 is directed inward to the main flux of the base pad 800 at 90 degrees off the angled surfaces of the recesses 876 and 878 of the ferrite. In some aspects, the design of base pad 800 may reduce emissions, but also may alter an amount of coupling with a vehicle pad at certain power levels.

Figure 9:
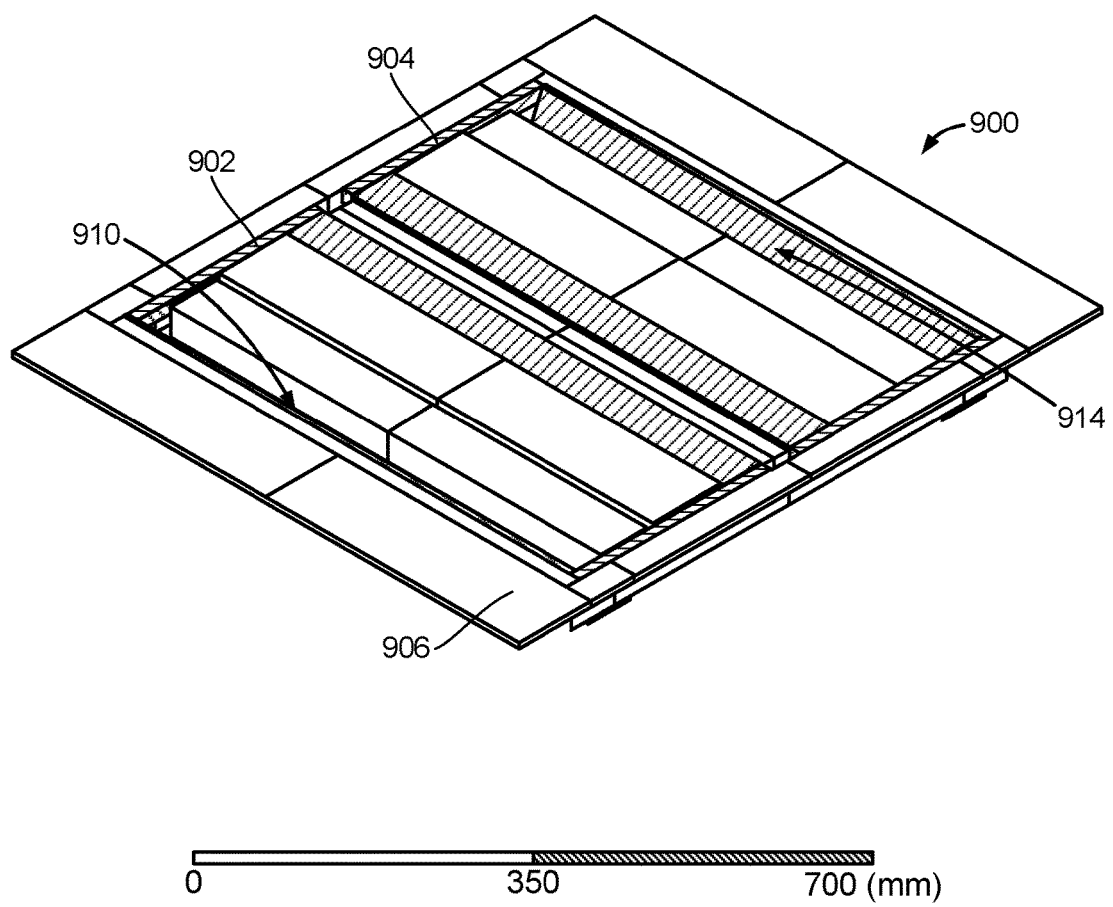
FIG. 9 illustrates a double-D base pad with angled structure, in accordance with some aspects.
Figure 9A:
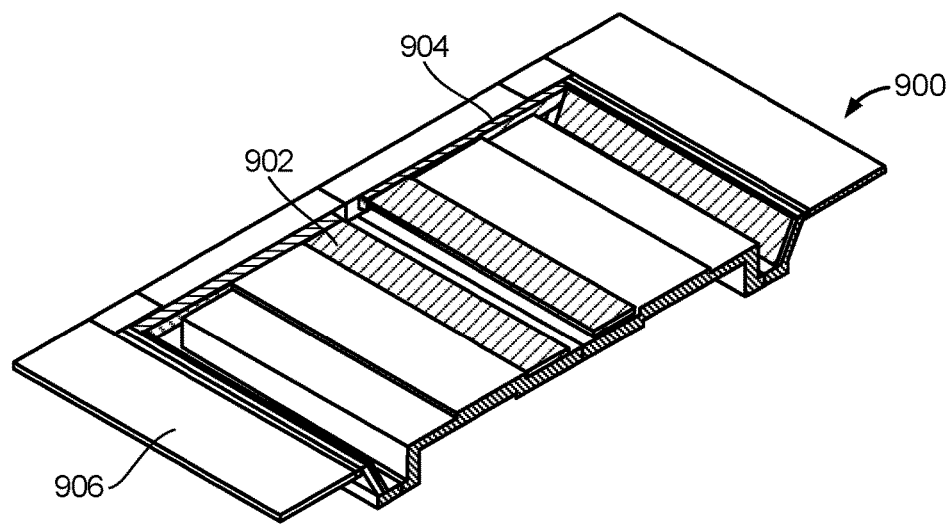
FIGS. 9A and 9B illustrate cutaway views of the base pad of FIG. 9.
Figure 9B:
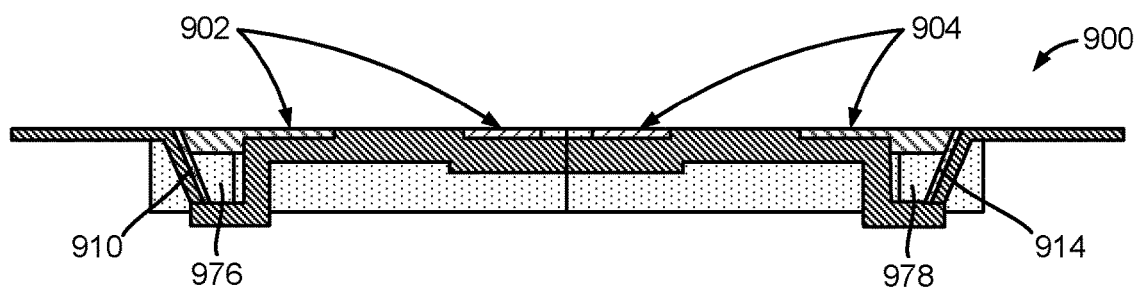

FIGS. 9-9B illustrate a double-D base pad 900 with angled structure, in accordance with some aspects. In particular, the base pad 900 may be similar to the base pad 500 described with respect to FIG. 5. However, the angled surfaces of the recesses 976 and 978 of the ferrite structure 906 and the outer sides 910 and 914 of the coils 902 and 904, respectively, may be at an increased angle to the angle shown in FIG. 5. In particular, the angle as shown may be about 60 degrees. The design of base pad 900 may reduce emissions at certain levels.

Figure 10:
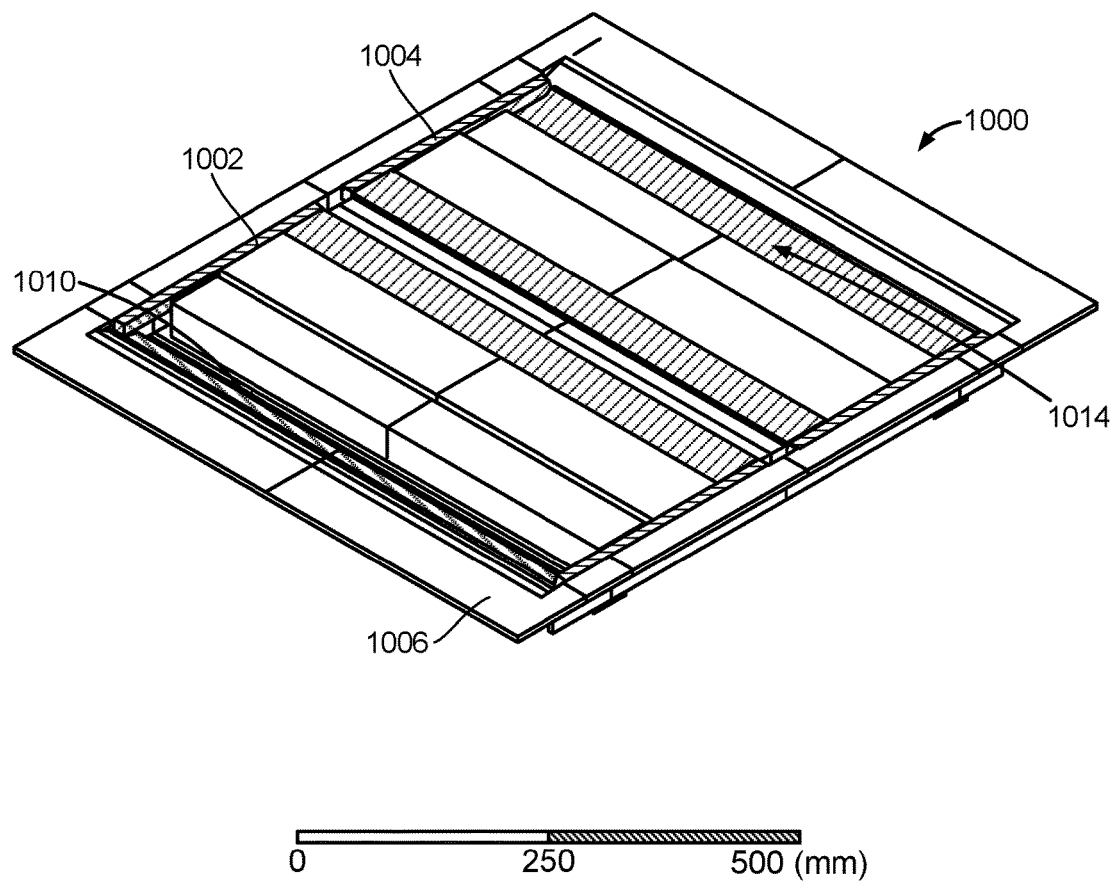
FIG. 10 illustrates a double-D base pad with angled structure, in accordance with some aspects.
Figure 10A:
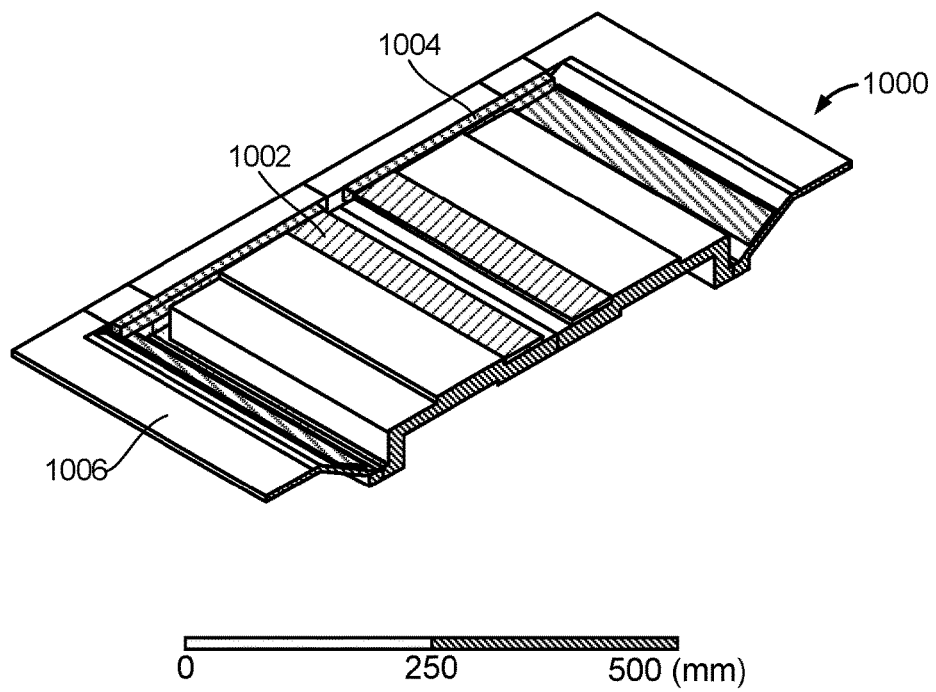
FIGS. 10A and 10B illustrate cutaway views of the base pad of FIG. 10.
Figure 10B:
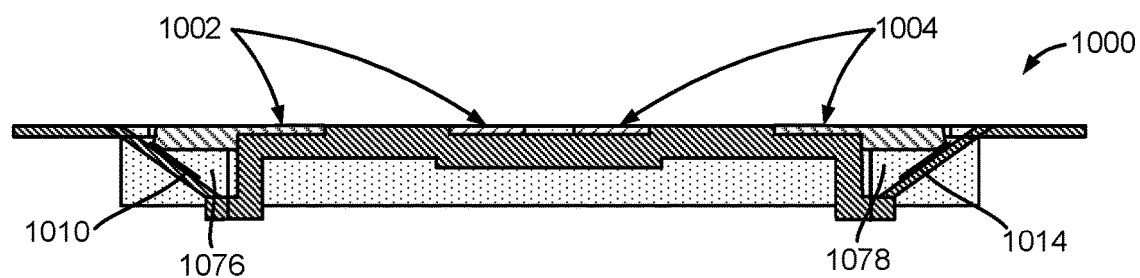

FIGS. 10-10B illustrate a double-D base pad 1000 with angled structure, in accordance with some aspects. In particular, the base pad 1000 may be similar to the base pad 500 described with respect to FIG. 5. However, the angled surfaces of the recesses 1076 and 1078 of the ferrite structure 1006 and the outer sides 1010 and 1014 of the coils 1002 and 1004, respectively, may be at a decreased angle to the angle shown in FIG. 5. In particular, the angle as shown may be about 30 degrees. The design of base pad 1000 may improve coupling, but may alter an amount of emissions at certain power levels.

Figure 11:
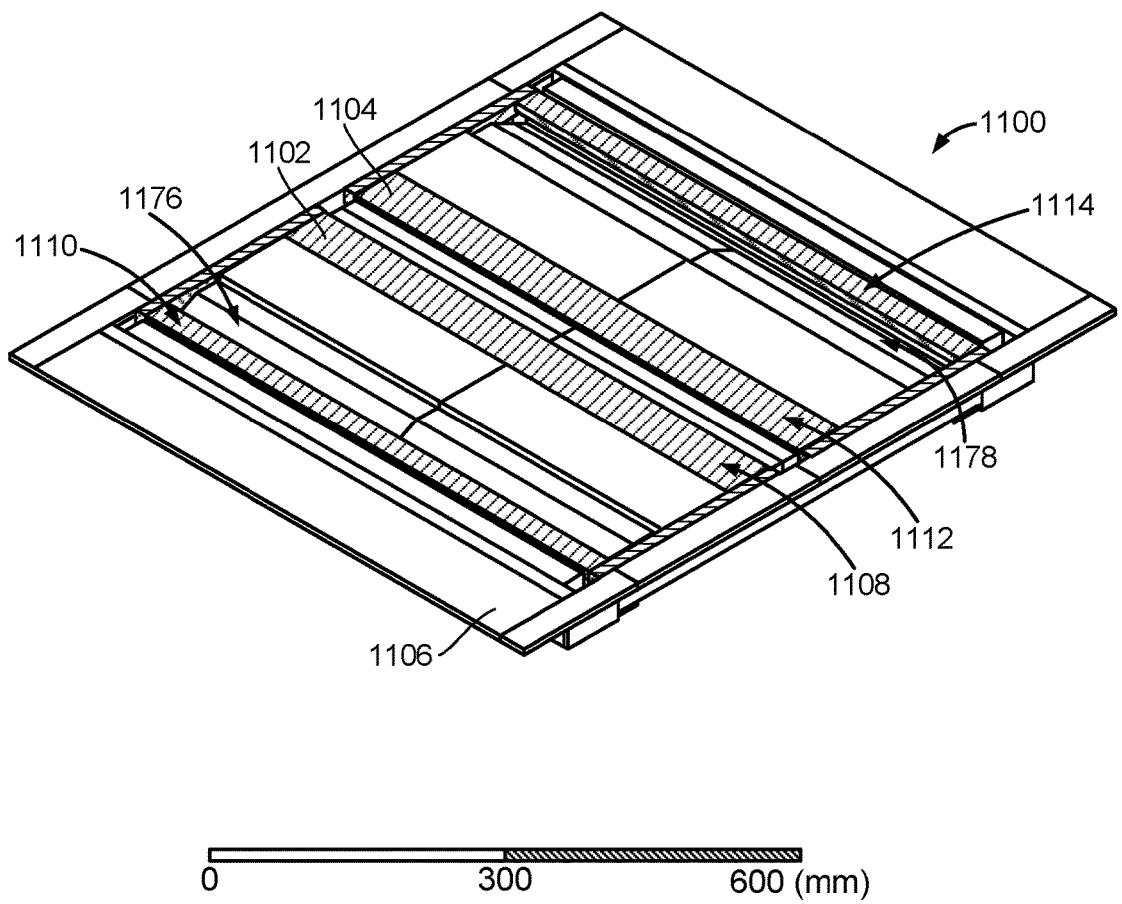
FIG. 11 illustrates a double-D base pad with angled structure, in accordance with some aspects.
Figure 11A:
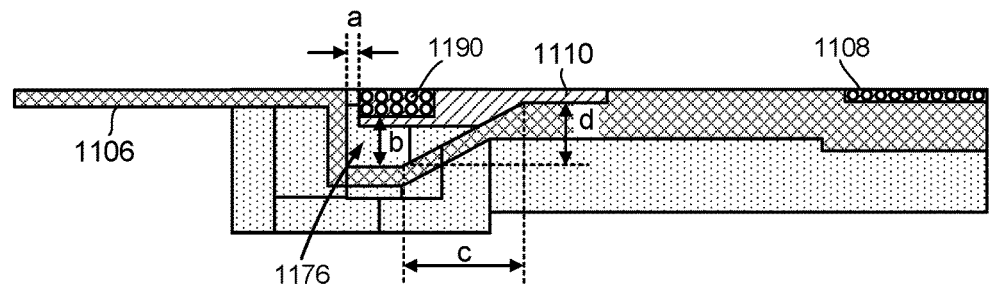
FIGS. 11A and 11B illustrate cutaway views of the base pad of FIG. 11.
Figure 11B:
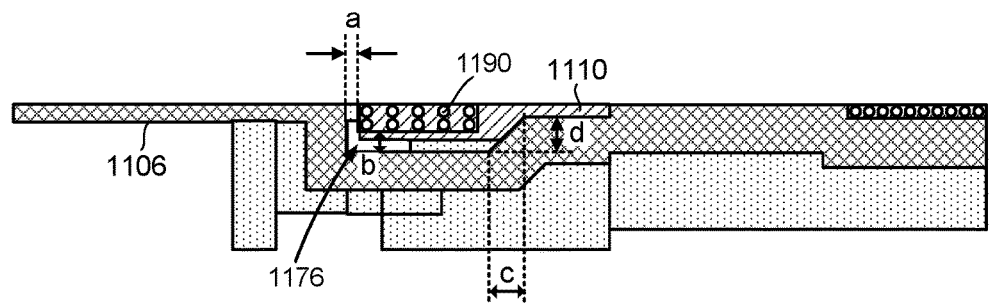

FIGS. 11-11B illustrate a double-D base pad 1100 with angled structure, in accordance with some aspects. In particular, the base pad 1100 may be similar to the base pad 500 described with respect to FIG. 5. However, the angled surfaces of the recesses 1176 and 1178 of the ferrite structure 1106 and the outer sides 1110 and 1114 of the coils 1102 and 1104, respectively, may be different than the coils 502, 504, and ferrite structure 506 of FIG. 5. In particular, the recesses 1176 and 1178 may be shaped differently than the recesses 576 and 578, and further, the outer sides 1110 and 1114 may be substantially parallel to a top planar surface of the ferrite structure 1106, instead of at an angle to the planar surface, like outer sides 510 and 514.

For example, as shown, the recess 1176 (and though not shown, similarly the recess 1178) may include an angled surface that is angled away from the main flux and toward the outside of the base pad 1100, as opposed toward the main flux and the inside/middle of the base pad 1100. Further, a side surface of each of the recesses 1176 and 1178 closest to the outside of the base pad 1100 may be substantially perpendicular to the planar surface at the top of the ferrite structure 1106. Further, each of the recesses 1176 and 1178 may, as shown, include a bottom surface that is substantially parallel to the planar surface. In some embodiments, the recesses 1176 and 1178 may not include a bottom surface that is substantially parallel to the planar surface. The recesses 1176 and 1178 may further include a ledge surface that is substantially parallel to the planar surface and contacts the outer side 1110 and 1114 respectively to hold the outer side 1110 and 1114 in place.

The outer side 1110 (and though not shown, similarly outer side 1114) may be formed of conductor 1190 that is tightly wound and spaced close together, as shown in FIG. 11A, or conductor 1190 that is loosely wound and spaced further apart, as shown in FIG. 11B.

The distances (a) and (b) between the coil 1102 and the ferrite structure 1106 of the recess 1176 (and similarly for the coil 1104) may be varied to move the coil 1102 further or closer to the ferrite structure 1106. Further, the distance (c) and (d) of the surfaces of the recess 1176 (and similarly for recess 1178) may vary the angle of the angled surface of the recess 1176 of the ferrite structure 1106. Adjusting the distance between the coils 1102 and 1104 and the ferrite structure 1106, and the angle of the angled surface of the ferrite structure 1106, may adjust the coupling and excess emissions of the base pad 1100. Like the base pad 500, the base pad 1100 may reduce emissions as compared to the base pad 400.

Figure 12:
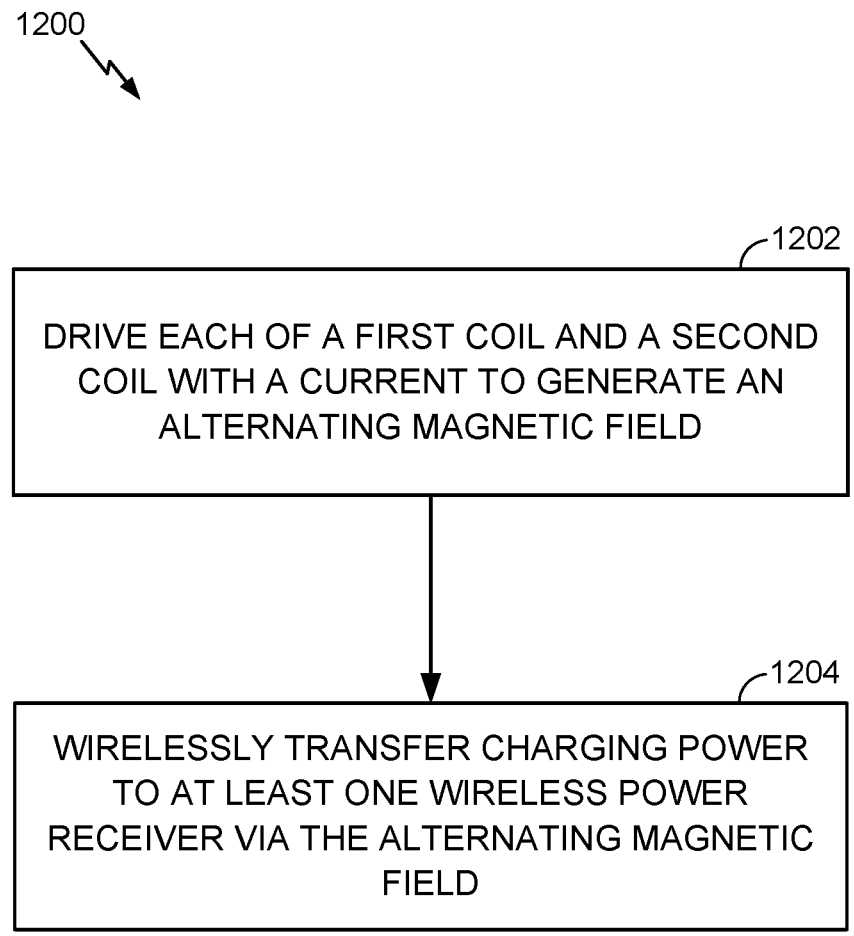
FIG. 12 is a flowchart depicting a method for wirelessly transferring charging power, in accordance with some aspects.

FIG. 12 is a flowchart depicting a method for wirelessly transferring charging power, in accordance with some aspects. The method of flowchart 1200 is described herein with reference to the coil arrangement as previously described in connection with any of FIGS. 5-11. Although the method of flowchart 1200 is described herein with reference to a particular order, in various aspects, blocks herein may be performed in a different order, or omitted, and additional blocks may be added.

The flowchart 1200 may start with block 1202, which includes driving each of a first coil and a second coil with a current to generate an alternating magnetic field. For example, a transmit circuit (e.g., the transmit circuitry 206 of FIG. 2) may be configured to drive each of the first coil 502 and a second coil 504 with a current to generate an alternating magnetic field 205.

Block 1204 includes wirelessly transferring charging power to at least one wireless power receiver (e.g., vehicle pad) via the alternating magnetic field. For example, the base pad 500 may be configured to wirelessly transfer charging power to at least one vehicle pad (e.g., a vehicle pad including the receiver 208 shown in FIG. 2) via the alternating magnetic field 205. The first coil 502 and the second coil 504 are positioned on one side of the ferrite structure 506. The ferrite structure 506 comprises a first angled surface at an outer side 510 of the first coil 502 and a second angled surface at an outer side 514 of the second coil 504. The ferrite structure 506 further comprises a flat surface at the inner side 508 of the first coil 502 and the inner side 512 of the second coil 504. The first angled surface and the second angled surface are at an angle to the flat surface.

In various embodiments, the first coil and the second coil can form at least a portion of a double D coil configuration. In various embodiments, successive windings of the first coil can be separated by a nonzero distance at the outer side of the first coil and successive windings of the second coil can be separated by a nonzero distance at the outer side of the second coil. In various embodiments, successive windings of the first coil can be substantially in physical contact at the outer side of the first coil and successive windings of the second coil can be substantially in physical contact at the outer side of the second coil.

In various embodiments, the ferrite structure, the first coil and the second coil can be buried below a driving surface.

In various embodiments, the ferrite structure, the first coil and the second coil can be flush mounted in a driving surface. In various embodiments, the ferrite structure can extend laterally beyond edges of the first coil and the second coil to form a ferrite border along an entire perimeter of the first coil and the second coil.

In various embodiments, the method can further include providing current to the first coil and to the second coil, such that current on the inner side of the first coil travels in the same direction as current on the inner side of the second coil.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosed aspects.

The various illustrative blocks, modules, and circuits described in connection with the aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the aspects disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described aspects will be readily apparent, and the generic principles defined herein may be applied to other aspects without departing from the spirit or scope of the application. Thus, the present application is not intended to be limited to the aspects shown herein but is to be accorded the widest scope consistent with the principles and novel features disclosed herein.

What is claimed is:

1. An apparatus for wirelessly transferring charging power, comprising:
    a first coil formed around a first opening within the first coil, the first coil comprising a first inner side and a first outer side positioned opposite the first inner side across the first opening;
    a second coil formed around a second opening within the second coil, the second coil comprising a second inner side and a second outer side positioned opposite the second inner side across the second opening, wherein the first inner side is adjacent to or at least partially overlapping the second inner side, wherein the first inner side and second inner side are positioned between the first outer side and the second outer side; and
    a ferrite structure comprising a first angled surface at the first outer side and a second angled surface at the second outer side, the ferrite structure further comprising a flat surface at the first inner side and the second inner side, wherein the first angled surface and the second angled surface are at an angle to the flat surface and not parallel to the flat surface, wherein the first angled surface and the second angled surface face toward the first inner side and the second inner side, wherein the first angled surface is configured to direct side flux generated by the first coil toward the first inner side, and wherein the second angled surface is configured to direct side flux generated by the second coil toward the second inner side.

2. The apparatus of claim 1, wherein the first coil and the second coil form at least a portion of a double D coil configuration.

3. The apparatus of claim 1, wherein the first inner side is adjacent to the second inner side, and wherein a distance between the first inner side and the second inner side is less than a distance between the first outer side and the second outer side.

4. The apparatus of claim 1, wherein the first coil and the second coil are at least partially overlapping.

5. The apparatus of claim 1, further comprising a driver configured to drive each of the first coil and the second coil such that current on the first inner side travels in the same direction as current on the second inner side, wherein the first coil and the second coil are coplanar, and wherein the first coil is adjacent to the second coil.

6. The apparatus of claim 5, wherein the first coil and the second coil are configured to generate main flux that exits from the first opening of the first coil and enters at the second opening of the second coil.

7. The apparatus of claim 1, further comprising a driver configured to generate a current in each of the first coil and the second coil to generate a magnetic field for wireless power transfer.

8. The apparatus of claim 1, wherein the first outer side and the second outer side are parallel to the flat surface.

9. The apparatus of claim 1, wherein the first outer side is parallel to the first angled surface, and wherein the second outer side is parallel to the second angled surface.

10. The apparatus of claim 1, wherein the first inner side and the second inner side are parallel to the flat surface.

11. The apparatus of claim 1, wherein the angle is between 30 degrees and 60 degrees.

12. The apparatus of claim 1, wherein the ferrite structure, the first coil and the second coil are buried below or flush mounted in a driving surface.

13. The apparatus of claim 1, wherein the ferrite structure extends laterally beyond edges of the first coil and the second coil.

14. The apparatus of claim 1, wherein the ferrite structure forms a ferrite border along an entire perimeter of the first coil and the second coil.

15. The apparatus of claim 1, wherein at least a portion of the first coil and second coil are recessed into the ferrite structure.

16. A method for wirelessly transferring charging power, comprising:
   driving each of a first coil and a second coil with a current to generate an alternating magnetic field; and
   wirelessly transferring charging power to at least one wireless power receiver via the alternating magnetic field, wherein:
   the first coil and the second coil are positioned on one side of a ferrite structure,
   the first coil is formed around a first opening within the first coil, the first coil comprising a first inner side and a first outer side positioned opposite the first inner side across the first opening,
   the second coil is formed around a second opening within the second coil, the second coil comprising a second inner side and a second outer side positioned opposite the second inner side across the second opening,
   the first inner side is adjacent to or at least partially overlapping the second inner side,
   the first inner side and second inner side are positioned between the first outer side and the second outer side,
   the ferrite structure comprises a first angled surface at the first outer side and a second angled surface at the second outer side,
   the ferrite structure further comprises a flat surface at the first inner side and the second inner side, and
   the first angled surface and the second angled surface are at an angle to the flat surface and not parallel to the flat surface,
   the first angled surface and the second angled surface face toward the first inner side and the second inner side,
   the first angled surface is configured to direct side flux generated by the first coil toward the first inner side, and
   the second angled surface is configured to direct side flux generated by the second coil toward the second inner side.

17. The method of claim 16, wherein the first coil and the second coil form at least a portion of a double D coil configuration.

18. The method of claim 16, wherein driving each of the first coil and the second coil comprises driving each of the first coil and the second coil such that current on the first inner side travels in the same direction as current on the second inner side, wherein the first coil and the second coil are coplanar, and wherein the first coil is adjacent to the second coil.

19. The method of claim 18, further comprising generating flux that exits from the first opening of the first coil and enters at the second opening of the second coil.

20. The method of claim 16, wherein the first outer side and the second outer side are parallel to the flat surface.

21. The method of claim 16, wherein the first outer side is parallel to the first angled surface, and wherein the second outer side is parallel to the second angled surface.

22. The method of claim 16, wherein the first inner side and the second inner side are parallel to the flat surface.

23. The method of claim 16, wherein the angle is between 30 degrees and 60 degrees.

24. An apparatus for wirelessly transferring charging power, comprising:
   means for generating an alternating magnetic field; and
   means for wirelessly transferring charging power to at least one wireless power receiver via the alternating magnetic field, wherein the means for wirelessly transferring charging power comprises a ferrite structure, the ferrite structure comprising a first angled surface at a first outer side of the ferrite structure and a second angled surface at a second outer side of the ferrite structure, the ferrite structure further comprising a flat surface at an inner side of the ferrite structure, the inner side being positioned between the first outer side and the second outer side, and wherein the first angled surface and the second angled surface are at an angle to the flat surface and not parallel to the flat surface, wherein the first angled surface and the second angled surface face toward the inner side, wherein the first angled surface is configured to direct side flux toward the inner side, and wherein the second angled surface is configured to direct side flux toward the inner side.

25. The apparatus of claim 24, further comprising means for generating flux that exits from one area of the ferrite structure between the first outer side and the inner side and enters at another area of the ferrite structure between the second outer side and the inner side.

26. The apparatus of claim 24, wherein the angle is between 30 degrees and 60 degrees.

27. An apparatus for wirelessly transferring charging power, comprising:
   a first coil having a plurality of turns wound around a first opening within the first coil, the first coil having a first inner side and a first outer side opposite the first inner side across the first opening;
   a second coil having a plurality of turns wound around a second opening within the second coil, the second coil having a second inner side and a second outer side opposite the second inner side across the second opening, wherein the first inner side is adjacent to or at least partially overlapping the second inner side, wherein the first inner side and second inner side are positioned between the first outer side and the second outer side, the plurality of turns of the first inner side of the first coil forming a first flat surface and the plurality of turns of the second inner side of the second coil forming a second flat surface, the plurality of turns of the first outer side of the first coil forming a first angled surface, and the plurality of turns of the second outer side of the second coil forming a second angled surface, wherein the first angled surface and the second angled surface are at an angle to the first flat surface and the second flat surface and not parallel to the first flat surface and the second flat surface, wherein the first angled surface and the second angled surface face toward the first inner side and the second inner side; and a ferromagnetic layer positioned on one side of the first and second coils.

28. The apparatus of claim 27, wherein the angle is between 30 degrees and 60 degrees.

29. The apparatus of claim 27, further comprising a driver configured to drive each of the first coil and the second coil such that current on the first inner side travels in the same direction as current on the second inner side.

* * * * *